(12) United States Patent
Sakata et al.

(10) Patent No.: US 10,696,216 B2
(45) Date of Patent: Jun. 30, 2020

(54) INFORMATION DISPLAY DEVICE AND INFORMATION DISPLAY METHOD

(71) Applicant: MITSUBISHI ELECTRIC CORPORATION, Tokyo (JP)

(72) Inventors: Reiko Sakata, Tokyo (JP); Akiko Imaishi, Tokyo (JP); Shinsaku Fukutaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 16/071,868

(22) PCT Filed: Feb. 12, 2016

(86) PCT No.: PCT/JP2016/054139
§ 371 (c)(1),
(2) Date: Jul. 20, 2018

(87) PCT Pub. No.: WO2017/138148
PCT Pub. Date: Aug. 17, 2017

(65) Prior Publication Data
US 2019/0016257 A1    Jan. 17, 2019

(51) Int. Cl.
*B60Q 1/50* (2006.01)
*G07C 5/08* (2006.01)
(52) U.S. Cl.
CPC .............. *B60Q 1/50* (2013.01); *G07C 5/0825* (2013.01); *B60Q 2400/50* (2013.01)
(58) Field of Classification Search
CPC ........ B60Q 1/50; B60Q 2400/50; B60Q 1/54; G07C 5/0825
See application file for complete search history.

(56) References Cited

U.S. PATENT DOCUMENTS

2009/0187307 A1    7/2009   Imaeda et al.
2016/0207448 A1*   7/2016   Galicia Badillo ..... B60Q 1/323
(Continued)

FOREIGN PATENT DOCUMENTS

DE    102006050548 A1    4/2008
DE    102012024494 A1    6/2014
(Continued)

OTHER PUBLICATIONS

Office Action issued in corresponding German Application No. 11 2016 006 199.4 dated May 7, 2019.
(Continued)

*Primary Examiner* — Rodney A Butler
(74) *Attorney, Agent, or Firm* — Birch, Stewart, Kolasch & Birch, LLP

(57) ABSTRACT

A vehicle state determining unit (1) for determining a state of a vehicle, a display data output unit (7) for outputting display data for displaying information indicating the state of the vehicle determined by the vehicle state determining unit (1), and an information displaying unit (10) for determining display time of the information from the state of the vehicle determined by the vehicle state determining unit (1) and displaying the information to the outside of the vehicle in accordance with the display data output from the display data output unit (7) during the display time, in which the information displaying unit (10) is configured to switch a display method of the information in accordance with the display time. Thus, a degree of information transmission may be increased.

8 Claims, 11 Drawing Sheets

(56) References Cited

U.S. PATENT DOCUMENTS

2017/0169703 A1\* 6/2017 Carrasco .................. B60Q 1/46
2018/0004020 A1\* 1/2018 Kunii ..................... G08G 1/167

FOREIGN PATENT DOCUMENTS

| DE | 102012223410 A1 | 6/2014 |
|----|-----------------|--------|
| JP | 2005-161977 A | 6/2005 |
| JP | 2006-96326 A | 4/2006 |
| JP | 2008-47006 A | 2/2008 |
| JP | 2009-166771 A | 7/2009 |
| JP | 2010-30354 A | 2/2010 |
| JP | 4582151 B2 | 11/2010 |
| JP | 4650717 B2 | 3/2011 |

OTHER PUBLICATIONS

International Search Report for PCT/JP2016/054139 (PCT/ISA/210) dated Apr. 12, 2016.

\* cited by examiner

FIG. 5

|  |  | Display Time |
|---|---|---|
| State of User's Vehicle | During Straight Travel Travelling Speed Equal to or Higher Than 40 km/h | Short |
|  | During Straight Travel Travelling Speed Lower Than 40 km/h | Long |
|  | During Curved Travel Travelling Speed Equal to or Higher Than 30 km/h | Short |
|  | During Curved Travel Travelling Speed Lower Than 30 km/h | Long |
| Target To Which Information Is Presented | Pedestrian | Long |
|  | Pedestrian | Long |
|  | Truck | Short |

FIG. 6
Case in Which Speed of User's Vehicle Is High
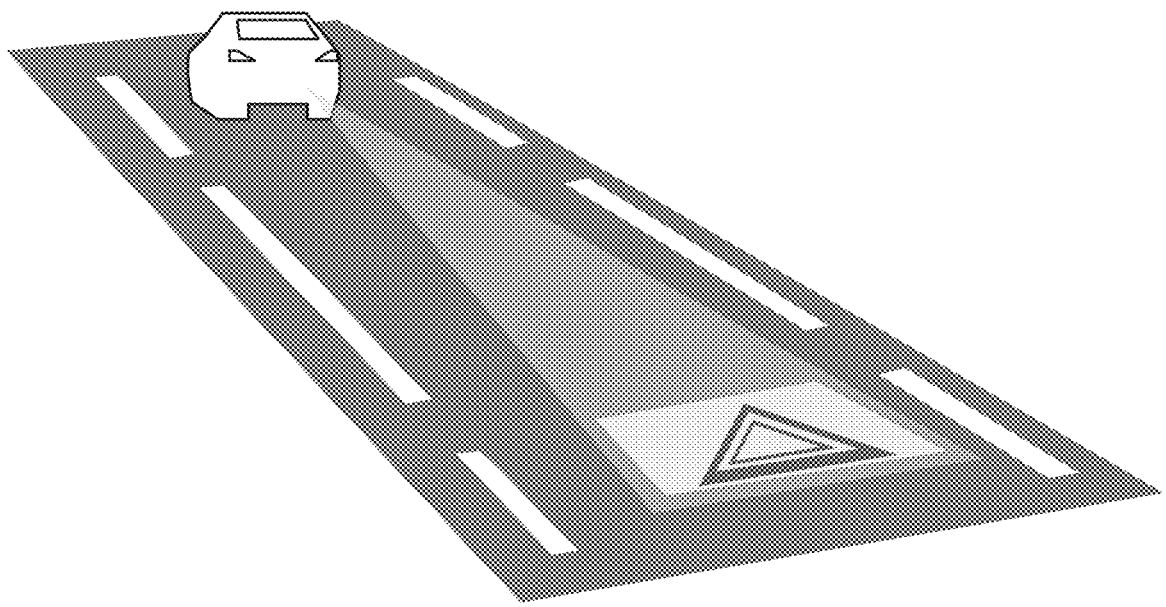
Case in Which Speed of User's Vehicle Is Low
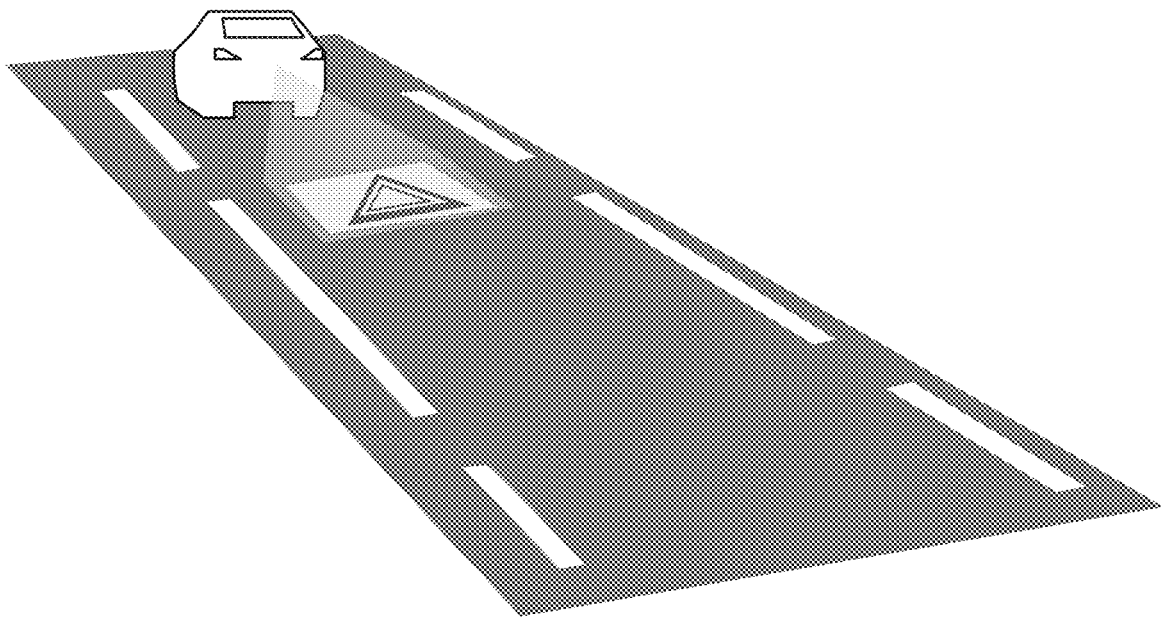

| Relative State | Display Time |
|---|---|
| Travelling Directions Are in Opposite Directions | Short |
| Travelling Directions Are in Same Direction | Long |
| Relative Speed Is Equal to or Higher Than 5 Km/H | Short |
| Relative Speed Is Lower Than 5 Km/H | Long |

INFORMATION DISPLAY DEVICE AND INFORMATION DISPLAY METHOD

TECHNICAL FIELD

The present invention relates to an information display device and an information display method for displaying information to the outside of a vehicle.

BACKGROUND ART

Patent Literature 1 below discloses an information display device for displaying information to the outside of a vehicle.

This information display device includes a projecting means for projecting information such as a speed of the vehicle on a road.

In addition, the information display device includes an obstacle detecting means for detecting an element which becomes an obstacle to the projection of the information when the projecting means projects the information on the road, and in a case in which an obstructive element is present, a projection position of the information is changed.

CITATION LIST

Patent Literature

Patent Literature 1: JP 2009-166771 A (for example, paragraphs [0004] and [0016])

SUMMARY OF INVENTION

Technical Problem

Since the conventional information display device is configured as described above, it is possible to project information on a position at which the projection of the information is not obstructed. However, the position at which the projection of the information is not obstructed is not always a position where the information is easy to see for passengers of other vehicles and pedestrians. Also, a projecting method of the information is not changed depending on the presence or absence of an obstructive element. For this reason, there is a problem in that information cannot be correctly transmitted.

The present invention is achieved for solving the above-described problem and an object thereof is to obtain an information display device and an information display method capable of improving a degree of information transmission.

Solution to Problem

An information display device according to the present invention includes a processor; and a memory storing instructions which, when executed by the processor, causes the processor to perform processes of: determining a state of a vehicle; outputting display data for displaying information indicating the determined state of the vehicle; for determining a target to which the information is presented; and determining display time of the information from the determined state of the vehicle and the determined target to which the information is presented, and displaying the information to an outside of the vehicle in accordance with the output display data during the display time, wherein the processor switches a display method of the information in accordance with the display time.

Advantageous Effects of Invention

According to the present invention, since the information displaying unit is configured to switch the display method of the information in accordance with the display time, there is an effect of increasing a degree of information transmission.

BRIEF DESCRIPTION OF DRAWINGS

FIG. 3 is a hardware configuration diagram of a computer in a case in which the information display device is implemented by software, firmware or the like.

FIG. 5 is a table diagram illustrating an example of a correspondence relationship between a state of a user's vehicle and a target to which information is presented, and display time of the information.

FIG. 6 is an illustrative view illustrating a display example of the information by an information display processing unit 12.

DESCRIPTION OF EMBODIMENTS

Embodiments for carrying out the present invention are hereinafter described with reference to the attached drawings in order to describe the present invention in more detail.

First Embodiment

Figure 1:
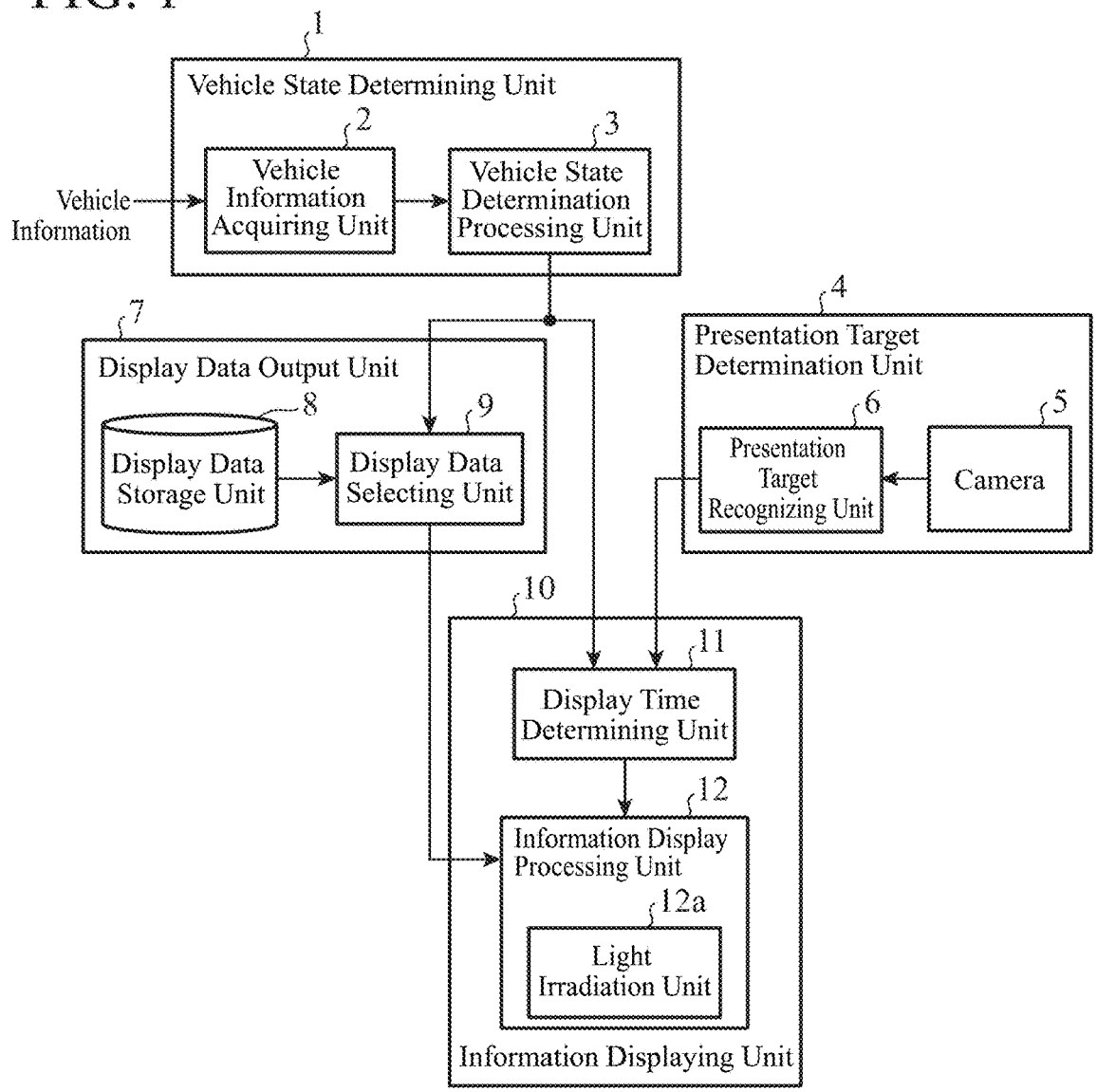
FIG. 1 is a configuration diagram illustrating an information display device according to a first embodiment of the present invention.
Figure 2:
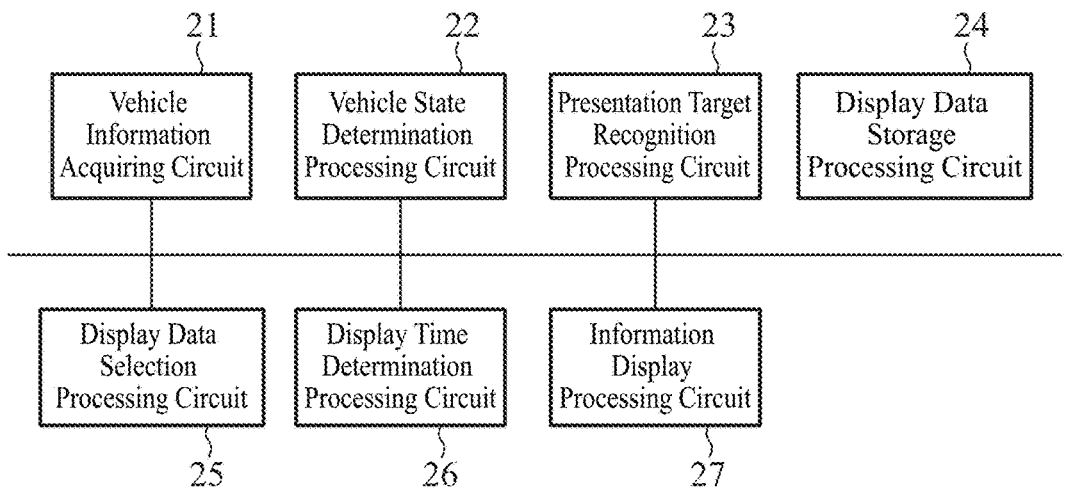
FIG. 2 is a hardware configuration diagram of the information display device according to the first embodiment of the present invention.

FIG. 1 is a configuration diagram illustrating an information display device according to a first embodiment of the present invention, and FIG. 2 is a hardware configuration diagram of the information display device according to the first embodiment of the present invention.

In FIGS. 1 and 2, a vehicle state determining unit 1 includes a vehicle information acquiring unit 2 and a vehicle state determination processing unit 3 and performs processing of determining a state of a vehicle.

The vehicle information acquiring unit 2 implemented by a vehicle information acquiring circuit 21 provided with an interface device for an in-vehicle network such as a controller area network (CAN), for example, performs processing of acquiring vehicle information indicating the state of the vehicle from an in-vehicle device through the in-vehicle network.

The vehicle information may include, for example, information output from a car navigation device, information output from a contact sensor mounted on the vehicle and the like in addition to CAN data including operation information of a blinker, a steering wheel, an accelerator, a brake, and a shift lever.

The information output from the car navigation device may include position information indicating a position of the vehicle, map information, route guidance information indicating a route to a destination of the vehicle and the like.

Also, the information output from the contact sensor may include, for example, operation detection information and the like in a case in which operation within a range of play is performed on the steering wheel, the accelerator, and the brake.

The vehicle state determination processing unit 3 implemented by a vehicle state determination processing circuit 22 in FIG. 2, for example, performs processing of determining the state of the vehicle from the vehicle information acquired by the vehicle information acquiring unit 2.

A presentation target determining unit 4 includes a camera 5 and a presentation target recognizing unit 6 and performs processing of determining a target to which information is presented.

The camera 5 attached to a user's vehicle photographs the surroundings of the user's vehicle and outputs visual data illustrating an image around the user's vehicle to the presentation target recognizing unit 6.

The presentation target recognizing unit 6 implemented by, for example, a presentation target recognition processing circuit 23 in FIG. 2 performs processing of determining an object present around the user's vehicle from the visual data output from the camera 5 by executing a well-known object recognition processing algorithm. That is, the presentation target recognizing unit 6 performs processing of recognizing the presentation target of the information by detecting the object present around the user's vehicle and determining a type of the object.

A display data output unit 7 includes a display data storage unit 8 and a display data selecting unit 9 and performs processing of outputting display data for displaying information indicating the state of the vehicle determined by the vehicle state determination processing unit 3.

The display data storage unit 8 implemented by a display data storage processing circuit 24 in FIG. 2, for example, stores the display data for displaying information to be presented to the outside the vehicle for each state of the vehicle. The display data stored in the display data storage unit 8 is, for example, animated display data including the information to be presented to the outside of the vehicle.

The display data selecting unit 9 implemented by a display data selection processing circuit 25 in FIG. 2 performs processing of selecting the display data corresponding to the state of the vehicle determined by the vehicle state determination processing unit 3 out of a plurality of display data stored in the display data storage unit 8.

An information displaying unit 10 includes a display time determining unit 11 and an information display processing unit 12 and performs processing of determining display time of information from the state of the vehicle determined by the vehicle state determination processing unit 3 and the presentation target recognized by the presentation target recognizing unit 6 and displaying the information to the outside of the vehicle in accordance with the display data output from the display data output unit 7 during the determined display time.

The display time determining unit 11 implemented by, for example, a display time determination processing circuit 26 in FIG. 2 performs processing of determining the display time of the information from the state of the vehicle determined by the vehicle state determination processing unit 3 and the presentation target recognized by the presentation target recognizing unit 6.

The information display processing unit 12 implemented by an information display processing circuit 27 in FIG. 2, for example, performs processing of displaying the information to the outside of the vehicle in accordance with the display data output from the display data output unit 7 during the display time determined by the display time determining unit 11.

That is, the information display processing unit 12 includes a light irradiation unit 12a which displays the information indicating the state of the vehicle on a projection surface by irradiating the projection surface outside the vehicle with, for example, laser light or light emitting diode (LED) light in accordance with the display data output from the display data output unit 7.

The light irradiation unit 12a switches the projection surface in accordance with the display time determined by the display time determining unit 11.

Meanwhile, the surface on which the light is projected may include a road surface around the vehicle, a body of the vehicle, a window of the vehicle and the like, and the body and the window of the vehicle are included as the projection surface outside the vehicle.

In FIG. 1, it is supposed that the vehicle information acquiring unit 2, the vehicle state determination processing unit 3, the presentation target recognizing unit 6, the display data storage unit 8, the display data selecting unit 9, the display time determining unit 11, and the information display processing unit 12 being the components except the camera 5 of the information display device are implemented by dedicated hardware illustrated in FIG. 2, that is, the vehicle information acquiring circuit 21, the vehicle state determination processing circuit 22, the presentation target recognition processing circuit 23, the display data storage processing circuit 24, the display data selection processing circuit 25, the display time determination processing circuit 26, and the information display processing circuit 27, respectively.

Herein, the display data storage processing circuit 24 corresponds to, for example, a non-volatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, an optical disk, a compact disk, a mini disk, a digital versatile disk (DVD) and the like.

Also, each of the vehicle information acquiring circuit 21, the vehicle state determination processing circuit 22, the presentation target recognition processing circuit 23, the display data selection processing circuit 25, the display time determination processing circuit 26, and the information display processing circuit 27 corresponds to, for example, a single circuit, a composite circuit, a programmed processor, a parallel-programmed processor, an application specific integrated circuit (ASIC), a field-programmable gate array (FPGA), or a combination thereof.

Also, the components of the information display device are not limited to those implemented by the dedicated hardware, and the information display device may also be implemented by software, firmware, or a combination of the software and firmware.

The software and firmware are stored as a program in a memory of a computer. The computer is intended to mean the hardware which executes the program, and corresponds to, for example, a central processing unit (CPU), a central processor, a processing unit, an arithmetic unit, a microprocessor, a microcomputer, a processor, a digital signal processor (DSP) and the like.

Figure 3:
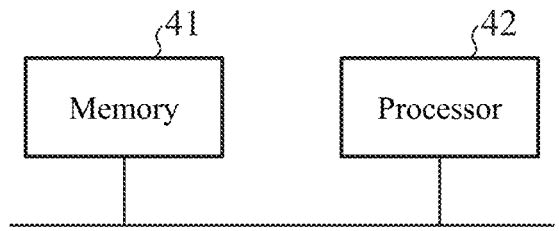

FIG. 3 is a hardware configuration diagram of the computer in a case in which the information display device is implemented by the software, firmware and the like.

In a case in which the information display device is implemented by the software, firmware and the like, the display data storage unit 8 may be configured on a memory 41 of the computer and a program for allowing the computer to execute processing procedures of the vehicle information acquiring unit 2, the vehicle state determination processing unit 3, the presentation target recognizing unit 6, the display data selecting unit 9, the display time determining unit 11, and the information display processing unit 12 may be stored in the memory 41, and a processor 42 of the computer may execute the program stored in the memory 41.

Figure 4:
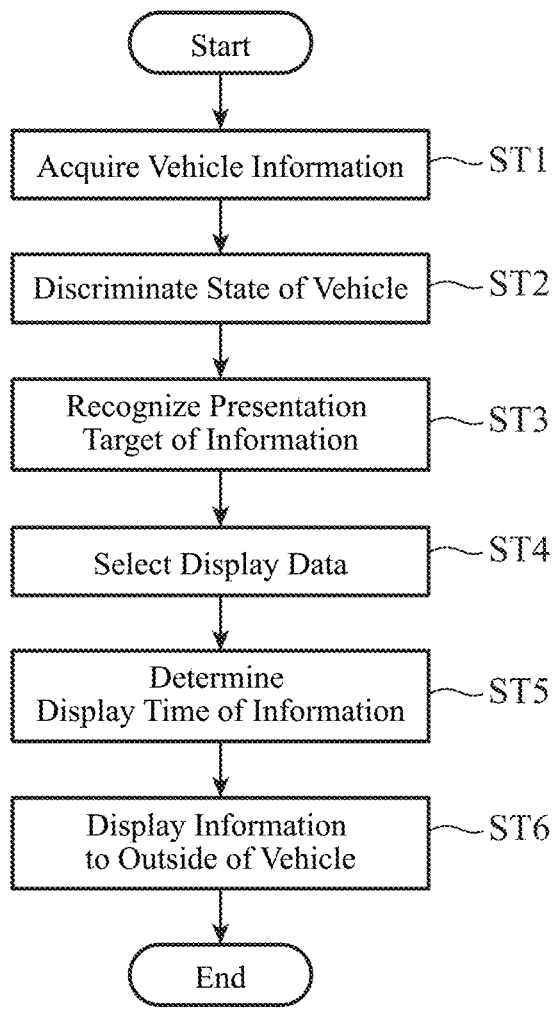
FIG. 4 is a flowchart illustrating an information display method which is a processing procedure of the information display device according to the first embodiment of the present invention.

FIG. 4 is a flowchart illustrating an information display method being the processing procedure of the information display device according to the first embodiment of the present invention.

Also, FIG. 2 illustrates an example in which each of the components of the information display device is implemented by dedicated hardware, and FIG. 3 illustrates an example in which the information display device is implemented by the software, firmware and the like; however, some components in the information display device may be implemented by the dedicated hardware and remaining components may be implemented by the software, firmware and the like.

For example, the vehicle information acquiring unit 2, the camera 5, and the information display processing unit 12 may be implemented by the dedicated hardware, and the vehicle state determination processing unit 3, the presentation target recognizing unit 6, the display data storage unit 8, the display data selecting unit 9, and the display time determining unit 11 may be implemented by the software, firmware and the like. A combination of the dedicated hardware, software and the like is freely selected.

Next, operations will be described.

The vehicle information acquiring unit 2 of the vehicle state determining unit 1 acquires the vehicle information indicating the state of the vehicle from the in-vehicle device through the in-vehicle network, and outputs the vehicle information to the vehicle state determination processing unit 3 (step ST1 in FIG. 4).

In the first embodiment, as the vehicle information, the information output from the car navigation device, the information output from the contact sensor mounted on the vehicle and the like are acquired, for example, in addition to the CAN data.

Upon receiving the vehicle information from the vehicle information acquiring unit 2, the vehicle state determination processing unit 3 determines the state of the vehicle from the vehicle information (step ST2).

The state of the vehicle may include, for example, a traveling speed of the vehicle, whether a traveling direction of the vehicle is curved and the like.

The traveling speed of the vehicle may be determined from speed information of the vehicle included in the CAN data.

Also, it is possible to determine whether the traveling direction of the vehicle is curved from the operation information of the steering wheel included in the CAN data.

Although an example of determining the traveling speed of the vehicle and whether the traveling direction of the vehicle is curved as the state of the vehicle is herein described, this is merely an example, and it goes without saying that other states of the vehicle may also be determined.

The camera 5 of the presentation target determining unit 4 photographs the surroundings of the user's vehicle and outputs the visual data illustrating the image around the user's vehicle to the presentation target recognizing unit 6.

Upon receiving the visual data from the camera 5, the presentation target recognizing unit 6 determines the object present around the user's vehicle from the visual data output from the camera 5 by executing the well-known object recognition processing algorithm.

That is, the presentation target recognizing unit 6 recognizes the presentation target of the information by detecting the object present around the user's vehicle and determining a type of the object (step ST3).

Since the object recognition processing algorithm is the well-known technology, the detailed description thereof is omitted, and a recognition processing example of a presentation target by the presentation target recognizing unit 6 is briefly described.

The presentation target recognizing unit 6 stores in advance images of four-wheeled vehicles such as typical passenger vehicles, trucks, and buses, images of two-wheeled vehicles such as bicycles and motorbikes, images of pedestrians and the like as reference images, for example.

The presentation target recognizing unit 6 performs processing of cutting out an image of the object from the image illustrated by the visual data output from the camera 5 and collates the cut-out image of the object with a plurality of reference images stored in advance.

Then, the presentation target recognizing unit 6 specifies the reference image having the highest degree of similarity in characteristics with the cut-out image of the object out of the plurality of reference images, and recognizes that a subject of the specified reference image is a target to which the information is presented.

For example, when the subject of the specified reference image is a truck, it is recognized that a target to which the information is presented is the truck, when the subject of the specified reference image is a bicycle, it is recognized that a target to which the information is presented is the bicycle, and when the subject of the specified reference image is a pedestrian, it is recognized that a target to which the information is presented is the pedestrian.

The display data storage unit 8 of the display data output unit 7 stores the display data for displaying the information to be presented to the outside the vehicle for each state of the vehicle.

The display data is, for example, the animated display data including the information to be presented to the outside the vehicle. The animated display data is, for example, data of a moving image pattern by which directionality of the traveling direction is transmitted such as a pattern and an arrow conforming to general road rules.

Also, the information to be presented to the outside of the vehicle may include, for example, information indicating the traveling direction of the vehicle, a traveling mode of the vehicle and the like, but any information may be used as long as this contributes to driving safety.

Incidentally, the traveling mode of the vehicle may include manual travel, automated travel, formation travel and the like.

The display data selecting unit 9 of the display data output unit 7 selects the display data corresponding to the state of the vehicle determined by the vehicle state determination processing unit 3 out of a plurality of display data stored in the display data storage unit 8, and outputs the display data to the information display processing unit 12 of the information displaying unit 10 (step ST4).

The display time determining unit 11 of the information displaying unit 10 holds a table as illustrated in FIG. 5.

FIG. 5 is a table diagram illustrating an example of a correspondence relationship between a state of the user's vehicle and a target to which information is presented, and the display time of the information.

A case in which the display time of the information is "short" corresponds to a case in which a time during which the presentation target of the information may verify the information (hereinafter referred to as "verifiable time") is short, and a case in which the display time of the information is "long" corresponds to a case in which the verifiable time of the presentation target of the information is long.

For example, in a case in which the speed of the user's vehicle is high, the time for the user's vehicle to pass is short, so that it is assumed that the verifiable time of the presentation target of the information becomes short. In contrast, in a case in which the speed of the user's vehicle is low, the time for the user's vehicle to pass is long, so that it is assumed that the verifiable time of the presentation target of the information becomes long.

In addition, in a case in which the presentation target of the information is the pedestrian, a walking speed is lower than the traveling speed of the vehicle, so that it is assumed that the verifiable time of the presentation target of the information becomes long. In contrast, in a case in which the presentation target of the information is the truck, it is necessary to pay attention to more things compared with the typical vehicle and the like for safe driving, so that it is assumed that the verifiable time of the presentation target of the information becomes short.

However, the correspondence relationship illustrated in the table in FIG. 5 is merely an example, and other correspondence relationships may also be used.

The display time determining unit 11 determines the display time of the information from the state of the vehicle determined by the vehicle state determination processing unit 3 and the presentation target recognized by the presentation target recognizing unit 6 with reference to the table in FIG. 5 (step ST5 in FIG. 4).

Hereinafter, an example of determination processing of the display time by the display time determining unit 11 is specifically described.

The display time determining unit 11 stores an initial value $T_0$ of the display time of the information.

Also, the display time determining unit 11 stores a coefficient a for shortening the display time of the information and a coefficient b for extending the display time of the information. The coefficient a is a numerical value equal to or larger than 0 and smaller than 1, and the coefficient b is a numerical value larger than 1.

Herein, for convenience of the description, it is distinguished that the coefficients corresponding to the state of the user's vehicle are $a_1$ and $b_1$, and the coefficients corresponding to a target to which information is presented are $a_2$ and $b_2$.

In the table in FIG. 5, it is illustrated that the display time of the information is made "short" when the speed of the user's vehicle is equal to or higher than 40 km/h during straight forward movement, and the display time of the information is made "long" when the speed of the user's vehicle is lower than 40 km/h during the straight forward movement, so that, for example, when the state of the vehicle determined by the vehicle state determination processing unit 3 is such that the traveling speed is equal to or higher than 40 km/h during the straight forward movement, the coefficient $a_1$ is adopted, and when the state of the vehicle determined by the vehicle state determination processing unit 3 is such that the traveling speed is lower than 40 km/h during the straight forward movement, the coefficient $b_1$ is adopted.

In a case in which the state of the vehicle determined by the vehicle state determination processing unit 3 is not stored in the table in FIG. 5, neither the coefficient $a_1$ nor the coefficient $b_1$ is adopted and a coefficient $c_1=1$ is adopted.

In the table in FIG. 5, it is illustrated that the display time of the information is made "short" when the presentation target of the information is the truck, and the display time of the information is made "long" when the presentation target of the information is the pedestrian or the two-wheeled vehicle, so that, for example, when the presentation target recognized by the presentation target recognizing unit 6 is the truck, the coefficient $a_2$ is adopted, and when the presentation target recognized by the presentation target recognizing unit 6 is the pedestrian or the two-wheeled vehicle, the coefficient $b_2$ is adopted.

In a case in which the presentation target recognized by the presentation target recognizing unit 6 is the typical passenger vehicle and the like and the presentation target is not stored in the table in FIG. 5, neither the coefficient $a_2$ nor the coefficient $b_2$ is adopted and a coefficient $c_2=1$ is adopted.

As represented by following expressions (1) to (9), the display time determining unit 11 determines display time T of information using the initial value $T_0$ of the display time of the information and the adopted coefficients.

$$[\text{Case in which } a_1 \text{ and } a_2 \text{ are adopted}] T=T_0 \times a_1 \times a_2 \quad (1)$$

$$[\text{Case in which } a_1 \text{ and } b_2 \text{ are adopted}] T=T_0 \times a_1 \times b_2 \quad (2)$$

$$[\text{Case in which } a_1 \text{ and } c_2 \text{ are adopted}] T=T_0 \times a_1 \times c_2 \quad (3)$$

$$[\text{Case in which } b_1 \text{ and } a_2 \text{ are adopted}] T=T_0 \times b_1 \times a_2 \quad (4)$$

$$[\text{Case in which } b_1 \text{ and } b_2 \text{ are adopted}] T=T_0 \times b_1 \times b_2 \quad (5)$$

$$[\text{Case in which } b_1 \text{ and } c_2 \text{ are adopted}] T=T_0 \times b_1 \times c_2 \quad (6)$$

[Case in which $c_1$ and $a_2$ are adopted] $T=T_0 \times c_1 \times a_2$ (7)

[Case in which $c_1$ and $b_2$ are adopted] $T=T_0 \times c_1 \times b_2$ (8)

[Case in which $c_1$ and $c_2$ are adopted] $T=T_0 \times c_1 \times c_2$ (9)

When the display time determining unit 11 determines an information display time T, the information display processing unit 12 of the information displaying unit 10 displays the information to the outside of the vehicle in accordance with the display data output from the display data output unit 7 during the display time T (step ST6 in FIG. 4).

That is, the light irradiation unit 12a of the information display processing unit 12 displays the information indicating the state of the vehicle on the projection surface by irradiating the projection surface outside the vehicle with the laser light or the LED light, for example, in accordance with the display data output from the display data output unit 7 during the display time T.

Also, the light irradiation unit 12a switches the projection surface in accordance with the display time T determined by the display time determining unit 11.

Hereinafter, an example of switching the display method in which the light irradiation unit 12a switches the projection surface will be specifically described. This is merely an example, and the display method may be switched by another method.

For example, the information display processing unit 12 compares thresholds $Th_1$ and $Th_2$ ($Th_1<Th_2$) set in advance with the display time T determined by the display time determining unit 11 and selects the road surface around the vehicle as the surface on which the information is projected when the display time T is equal to or longer than the threshold $Th_2$ (case of $T \geq Th_2$), and the light irradiation unit 12a irradiates the road surface around the vehicle with the light.

Also, when the display time T is equal to or longer than the threshold $Th_1$ but shorter than the threshold $Th_2$ (case of $Th_1 \leq T<Th_2$), the information display processing unit 12 selects the body of the vehicle that is more easily viewed than the road surface as the surface on which the information is projected, and the light irradiation unit 12a irradiates the body of the vehicle with the light.

Also, when the display time T is shorter than the threshold $Th_1$ (case of $T<Th_1$), the information display processing unit 12 selects the window of the vehicle that is more easily viewed than the body of the vehicle as the surface on which the information is projected, and the light irradiation unit 12a irradiates the window of the vehicle with the light.

Figure 7:
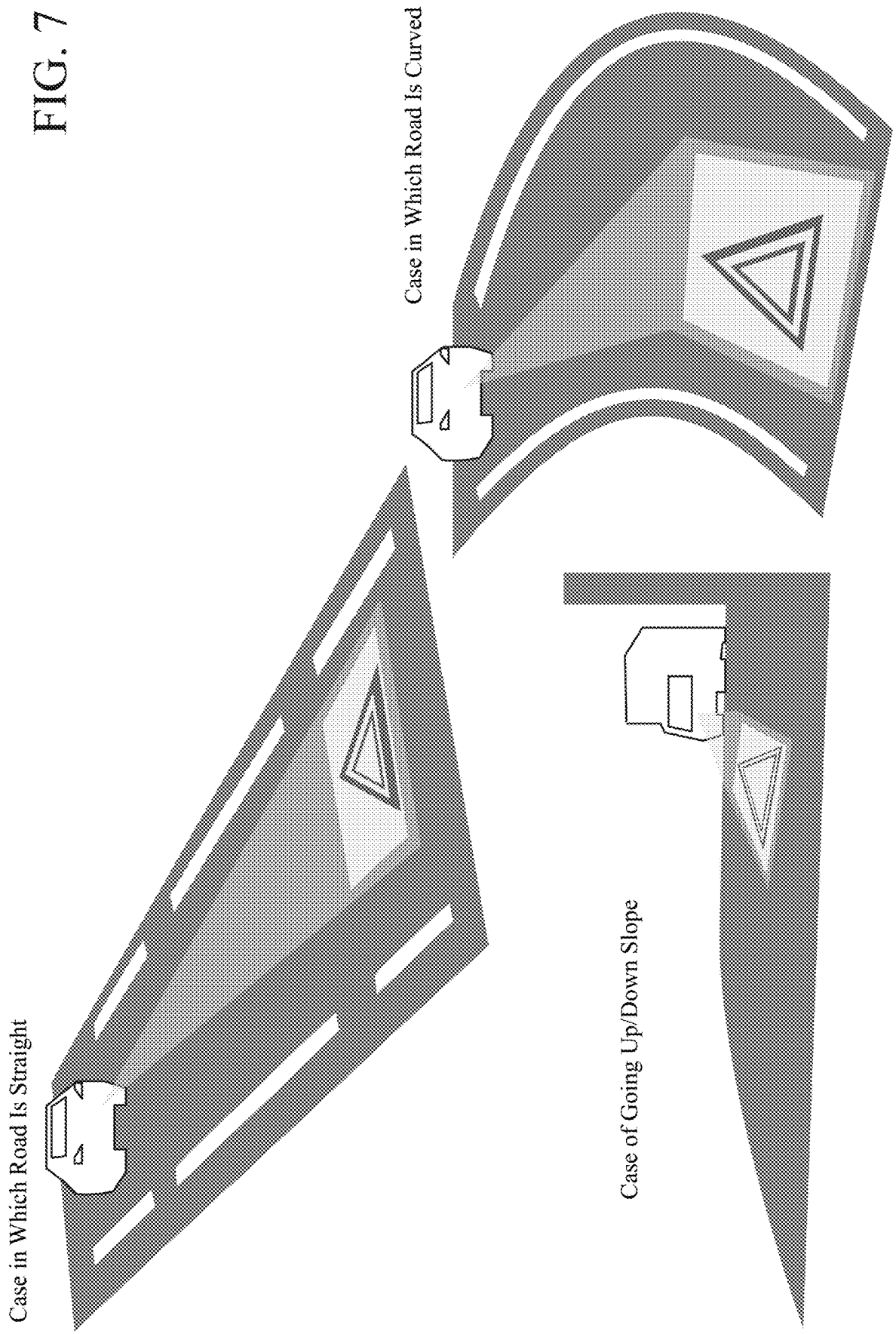
FIG. 7 is an illustrative view illustrating a display example of the information by the information display processing unit 12.

FIGS. 6 and 7 are illustrative views illustrating a display example of the information by the information display processing unit 12.

FIGS. 6 and 7 illustrate the example in which the road surface around the vehicle is irradiated with the light. In FIGS. 6 and 7, in order to simply describe, an example in which the information to be presented is a triangular symbol is illustrated.

FIG. 6 illustrates an example of a case in which the speed of the user's vehicle is high and a case in which the speed of the user's vehicle is low, and an irradiation position is switched in accordance with the speed of the user's vehicle.

That is, when the speed of the user's vehicle is high, the light irradiation unit 12a of the information display processing unit 12 irradiates the road surface in a position far from the user's vehicle with the light, and when the speed of the user's vehicle is low, the light irradiation unit 12a irradiates the road surface in a position close to the user's vehicle with the light.

FIG. 7 illustrates an example of a case in which the road is straight, a case in which the road is curved, and a case in which the road is a slope, and the irradiation position is switched in accordance with the shape of the road.

That is, in a case in which the road is straight, the light irradiation unit 12a of the information display processing unit 12 irradiates the road surface behind the user's vehicle with the light, in a case in which the road is curved, the light irradiation unit 12a irradiates the road surface in a direction corresponding to the curve of the road with the light, and in a case in which the road is the slope, the light irradiation unit 12a irradiates the road surface with the light at a position where the presentation target of the information may see.

Also, for example, in a case in which the information display time T is equal to or longer than the initial value $T_0$, the information display processing unit 12 decreases the speed of the animation which is the information to be presented, but in a case in which the information display time T is shorter than the initial value $T_0$, the information display processing unit 12 changes the display such that the presentation target of the information may more easily verify the information to be presented by increasing an animation speed, enlarging a display area of the animation, blinking the same, or darkening the color thereof.

As is clear from the above description, according to the first embodiment, the vehicle state determining unit 1 which determines the state of the vehicle, the display data output unit 7 which outputs the display data for displaying the information indicating the state of the vehicle determined by the vehicle state determining unit 1, and the information displaying unit 10 which determines the display time of the information from the state of the vehicle determined by the vehicle state determining unit 1 and displays the information to the outside of the vehicle in accordance with the display data output from the display data output unit 7 during the display time are provided, and the information displaying unit 10 is configured to switch the display method of the information in accordance with the display time, so that there is an effect of improving a degree of information transmission.

Also, according to the first embodiment, the presentation target determining unit 4 which determines the presentation target of the information is provided, and the information displaying unit 10 is configured to determine the display time of the information from the state of the vehicle determined by the vehicle state determining unit 1 and the presentation target determined by the presentation target determining unit 4, so that there is an effect of determining the display time of the information corresponding to the presentation target of the information.

In the first embodiment, the example in which the presentation target recognizing unit 6 may recognize the pedestrian as the presentation target of the information is described, but it is also possible to measure an approximate body height of the pedestrian from the visual data output from the camera 5 and determine whether the body height of the pedestrian is equal to or higher than a reference value. Since the processing of measuring the approximate body height of the pedestrian from the visual data is the well-known technology, the detailed description thereof is omitted. The reference value may be, for example, 125 cm or the like.

In this case, in the table held in the display time determining unit 11, for example, it is illustrated that the display time of the information is made "long" when the body height of the pedestrian is equal to or higher than the reference value, and that the display time of the information is made "short" when the body height of the pedestrian is lower than the reference value.

It is also possible to detect a line of sight of the pedestrian from the visual data output from the camera 5 to determine whether the line of sight of the pedestrian is in the direction of the user's vehicle.

It is also possible to determine whether the pedestrian is operating a mobile phone, a smartphone and the like from the visual data output from the camera 5. Since the determining technologies are well-known, the detailed description thereof is omitted.

In the table held in the display time determining unit 11, for example, it is illustrated that the display time of the information is made "short" in a case in which the line of sight of the pedestrian is not in the direction of the user's vehicle and a case in which the pedestrian is operating the mobile phone, the smartphone and the like, and that the display time of the information is made "long" in a case in which the line of sight of the pedestrian is in the direction of the user's vehicle and a case in which the pedestrian is not operating the mobile phone, the smartphone and the like.

In the first embodiment, it is described that the light irradiation unit 12a of the information display processing unit 12 irradiates the projection surface with the laser light or the LED light, but it is also possible to change the type of light irradiated to the projection surface in accordance with the display time T determined by the display time determining unit 11.

For example, in a case in which the information display time T is shorter than the initial value $T_0$, the projection surface is irradiated with the laser light, and in a case in which the information display time T is equal to or longer than the initial value $T_0$, the projection surface is irradiated with the LED light while emphasis on safety rather than visibility of the information is placed.

Second Embodiment

In the first embodiment, it is described that the display time determining unit 11 determines the information display time T from the state of the vehicle determined by the vehicle state determination processing unit 3 and the presentation target recognized by the presentation target recognizing unit 6; however, it is also possible to determine the information display time T from a relative state between a user's vehicle and the presentation target.

Figure 8:
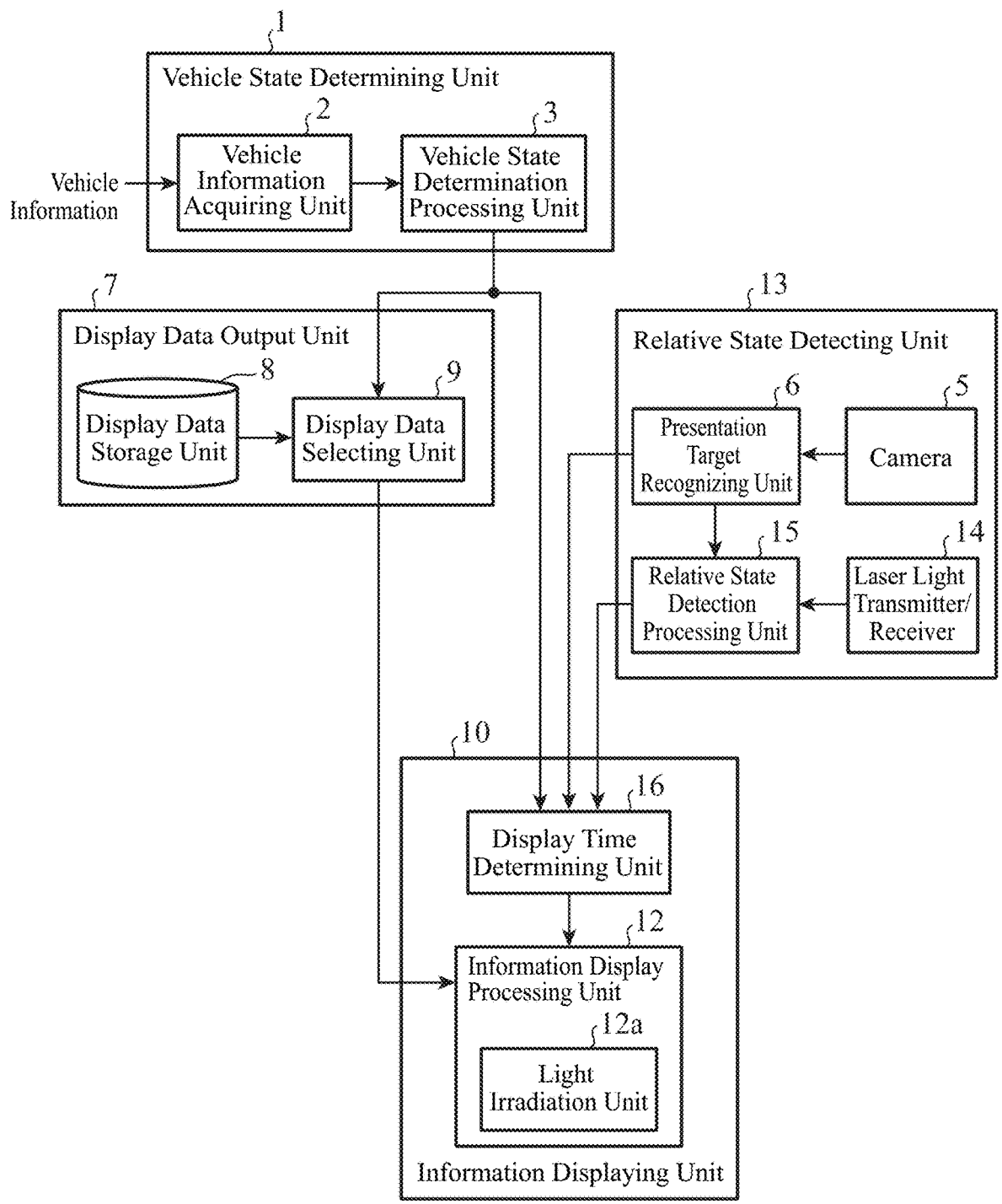
FIG. 8 is a configuration diagram illustrating an information display device according to a second embodiment of the present invention.
Figures 9, 10:
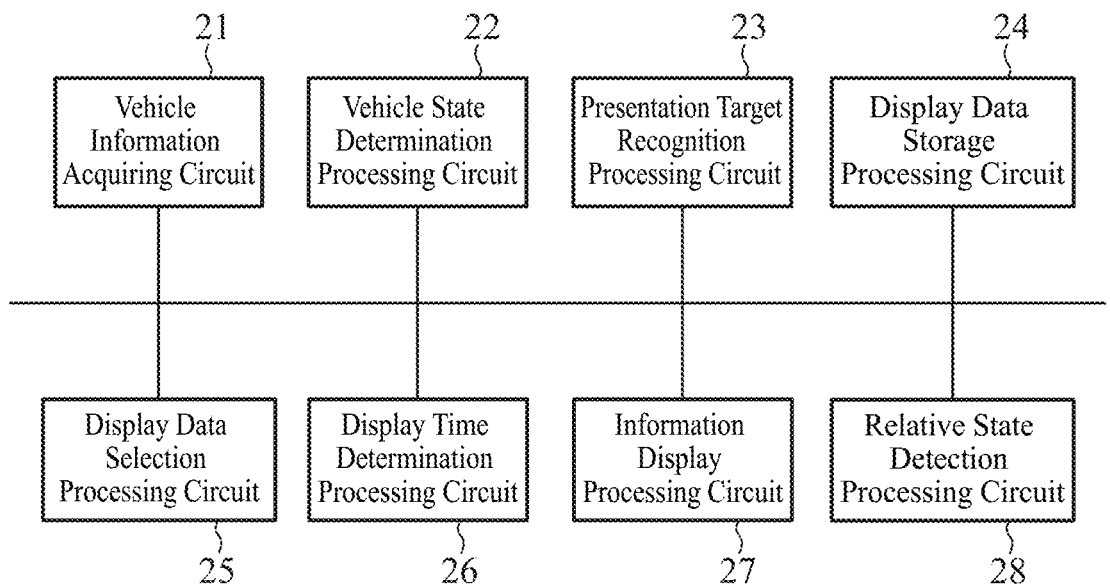
FIG. 9 is a hardware configuration diagram of the information display device according to the second embodiment of the present invention.
FIG. 10 is a table diagram illustrating an example of a correspondence relationship between a relative state between a user's vehicle and a presentation target, and display time of the information.

FIG. 8 is a configuration diagram illustrating an information display device according to a second embodiment of the present invention, and FIG. 9 is a hardware configuration diagram of the information display device according to the second embodiment of the present invention.

In FIGS. 8 and 9, the same reference signs as those in FIGS. 1 and 2 represent the same or corresponding parts, so that the description thereof is omitted.

A relative state detecting unit 13, for example, includes a camera 5, a presentation target recognizing unit 6, a laser light transmitter/receiver 14, and a relative state detection processing unit 15 and performs processing of detecting the relative state between the user's vehicle and the presentation target of the information.

The laser light transmitter/receiver 14 transmits laser light toward the presentation target of the information, and thereafter receives the laser light reflected and returned from the presentation target of the information.

The relative state detection processing unit 15 is implemented by, for example, a semiconductor integrated circuit on which a CPU is mounted, or a relative state detection processing circuit 28 in FIG. 9 formed of a one-chip microcomputer or the like.

The relative state detection processing unit 15 performs processing of detecting a traveling direction of the presentation target from an image of the presentation target cut out by the presentation target recognizing unit 6 as the relative state between the user's vehicle and the presentation target of the information.

The relative state detection processing unit 15 also performs processing of calculating a relative speed between the user's vehicle and the presentation target of the information from time during which the laser light is transmitted from the laser light transmitter/receiver 14, and then the laser light is received by the laser light transmitter/receiver 14, as the relative state between the user's vehicle and the presentation target.

A display time determining unit 16 implemented by, for example, a display time determination processing circuit 26 in FIG. 9 performs processing of determining display time of information from a state of a vehicle determined by a vehicle state determination processing unit 3 and the presentation target recognized by the presentation target recognizing unit 6 as is the case with the display time determining unit 11 in FIG. 1.

However, unlike the display time determining unit 11 in FIG. 1, the display time determining unit 16 takes into consideration the relative state detected by the relative state detection processing unit 15 when determining the display time of the information.

In FIG. 8, it is supposed that a vehicle information acquiring unit 2, the vehicle state determination processing unit 3, the presentation target recognizing unit 6, the relative state detection processing unit 15, a display data storage unit 8, a display data selecting unit 9, the display time determining unit 16, and an information display processing unit 12 being components except the camera 5 and the laser light transmitter/receiver 14 of the information display device are implemented by dedicated hardware illustrated in FIG. 9, that is, a vehicle information acquiring circuit 21, a vehicle state determination processing circuit 22, a presentation target recognition processing circuit 23, the relative state detection processing circuit 28, a display data storage processing circuit 24, a display data selection processing circuit 25, the display time determination processing circuit 26, and an information display processing circuit 27, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 8 may be configured on the memory 41 of the computer illustrated in FIG. 3 and a program for allowing the computer to execute processing procedures of the vehicle information acquiring unit 2, the vehicle state determination processing unit 3, the presentation target recognizing unit 6, the relative state detection processing unit 15, the display data selecting unit 9, the display time determining unit 16, and the information display processing unit 12 may be stored in the memory 41, and the processor 42 of the computer may execute the program stored in the memory 41.

Next, operations will be described.

The components other than the relative state detecting unit 13 and the display time determining unit 16 are similar to those of the first embodiment, so that processing content of the relative state detecting unit 13 and the display time determining unit 16 is herein described.

The laser light transmitter/receiver 14 of the relative state detecting unit 13 transmits the laser light toward the presentation target of the information, and thereafter receives the laser light reflected and returned from the presentation target of the information. Although an example in which the laser light transmitter/receiver 14 transmits and receives the laser light is herein described, it is not limited to the laser light, and infrared light or the like may also be transmitted and received, for example.

When the relative state detection processing unit 15 of the relative state detecting unit 13 detects the traveling direction of the presentation target from the image of the presenting party as the relative state between the user's vehicle and the presentation target of the information when the presentation target recognizing unit 6 cuts out the image of the presentation target of the information from the visual data output from the camera 5 as in the first embodiment.

That is, the relative state detection processing unit 15 determines whether the presentation target of the information and the user's vehicle travel in the same direction or in the opposite directions.

Since processing of detecting the traveling direction of the presentation target is the well-known technology, the detailed description thereof is omitted, but when the image of the presentation target is the image of a front part of a vehicle body, it may be determined that the presentation target travels in the opposite direction, and when the image of the presentation target is the image of a rear part of a vehicle body, it may be determined that the presentation target travels in the same direction.

The relative state detection processing unit 15 also calculates the relative speed between the user's vehicle and the presentation target of the information from the time during which the laser light is transmitted from the laser light transmitter/receiver 14 and then the laser light is received by the laser light transmitter/receiver 14, as the relative state between the user's vehicle and the presentation target. Since a speed of the laser light is known, it is possible to calculate the relative speed between the user's vehicle and the presentation target of the information from time difference between transmission time and reception time of the laser light.

The display time determining unit 16 of the information displaying unit 10 stores a table as illustrated in FIG. 10 in addition to a table illustrated in FIG. 5.

FIG. 10 is a table diagram illustrating an example of a correspondence relationship between the relative state between the user's vehicle and the presentation target of the information, and the display time of the information.

For example, in a case in which the presentation target of the information and the user's vehicle travel in the opposite directions, time for the user's vehicle to pass is short, so that it is considered that a verifiable time by the presentation target of the information becomes short. On the other hand, in a case in which the presentation target of the information and the user's vehicle travel in the same direction, the time for the user's vehicle to pass is long, so that it is considered that the verifiable time by the presentation target of the information becomes long.

However, the correspondence relationship illustrated in the table in FIG. 10 is merely an example, and other correspondence relationships may also be used.

The display time determining unit 16 determines the information display time T from the state of the vehicle determined by the vehicle state determination processing unit 3 and the presentation target recognized by the presentation target recognizing unit 6 as is the case with the display time determining unit 11 in FIG. 1.

However, unlike the display time determining unit 11 in FIG. 1, when the display time of the information is determined, the relative state detected by the relative state detection processing unit 15 is taken into consideration.

Hereinafter, an example of determination processing of the display time by the display time determining unit 16 is specifically described.

The display time determining unit 16 first determines the information display time T from the state of the vehicle determined by the vehicle state determination processing unit 3 and the presentation target recognized by the presentation target recognizing unit 6 as is the case with the display time determining unit 11 in FIG. 1.

Thereafter, the display time determining unit 16 corrects the determined display time T depending on the relative state detected by the relative state detection processing unit 15. This is specifically represented as follows.

The display time determining unit 16 stores a coefficient d for shortening the display time of the information and a coefficient e for extending the display time of the information. The coefficient d is a numerical value equal to or larger than 0 and smaller than 1, and the coefficient e is a numerical value larger than 1.

Herein, for convenience of description, it is distinguished that coefficients regarding the traveling direction of the user's vehicle and the presentation target are $d_1$ and $e_1$, and coefficients regarding the relative speed between the user's vehicle and the presentation target are $d_2$ and $e_2$.

In the table in FIG. 10, it is illustrated that the display time of the information is made "short" when the traveling directions of the user's vehicle and the presentation target are opposite to each other, and that the display time of the information is made "long" when they travel in the same direction, so that the coefficient $d_1$ is adopted when the traveling directions detected by the relative state detection processing unit 15 are opposite to each other and the coefficient $e_1$ is adopted when the traveling directions detected by the relative state detection processing unit 15 is the same direction.

In the table in FIG. 10, it is illustrated that when the relative speed between the user's vehicle and the presentation target of the information is equal to or higher than 5 km/h, the display time of the information is made "short", and when the relative speed between the user's vehicle and the presentation target of the information is 5 km/h or lower, the display time of the information is made "long", so that when the relative speed detected by the relative state detection processing unit 15 is equal to or higher than 5 km/h, the coefficient $d_2$ is adopted, and when the relative speed detected by the relative state detection processing unit 15 is lower than 5 km/h, the coefficient $e_2$ is adopted.

As represented by following expressions (10) to (13), the display time determining unit 11 corrects the information display time T using the display time T determined above and the adopted coefficient. This is set as corrected display time T'.

$$[\text{Case in which } d_1 \text{ and } d_2 \text{ are adopted}] T'=T \times d_1 \times d_2 \quad (10)$$

$$[\text{Case in which } d_1 \text{ and } e_2 \text{ are adopted}] T'=T \times d_1 \times e_2 \quad (11)$$

$$[\text{Case in which } e_1 \text{ and } d_2 \text{ are adopted}] T'=T \times e_1 \times d_2 \quad (12)$$

$$[\text{Case in which } e_1 \text{ and } e_2 \text{ are adopted}] T'=T \times e_1 \times e_2 \quad (13)$$

As is apparent from the above description, according to the second embodiment, there is provided the relative state detection processing unit 15 which detects the relative state between the user's vehicle and the presentation target of the information, and the information displaying unit 10 is configured to correct the determined display time by using the relative state detected by the relative state detection processing unit 15, so that there is an effect of making the display time of the information appropriate as compared to the first embodiment.

In the second embodiment, the example in which the display time determining unit 16 determines the information display time T from the state of the vehicle determined by the vehicle state determination processing unit 3 and the presentation target recognized by the presentation target recognizing unit 6 and thereafter corrects the display time T in consideration of the relative state detected by the relative state detection processing unit 15; however, it is also possible to determine the information display time T from the relative state detected by the relative state detection processing unit 15 without determining the information display time T from the state of the vehicle determined by the vehicle state determination processing unit 3 and the presentation target recognized by the presentation target recognizing unit 6.

In this case, the display time determining unit 16 treats the relative state detected by the relative state detecting unit 13 just like the state of the vehicle, so that a vehicle state determining unit 1 is eliminated when the display time determining unit 16 determines the display time.

Also, at that time, when the display data selecting unit 9 uses the relative state detected by the relative state detecting unit 13 as the state of the vehicle determined by the vehicle state determination processing unit 3, and selects the display data corresponding to the relative state, the vehicle state determining unit 1 can be eliminated.

Herein, it is described that the relative state detection processing unit 15 detects the traveling directions of the user's vehicle and the presentation target and the relative speed between them as the relative state between the user's vehicle and the presentation target; however, for example, a relative distance may also be detected.

For example, in a case in which the relative state detection processing unit 15 detects the relative distance, when the relative distance is long, for example, the information display processing unit 12 may allow the presentation target of the information to recognize a dangerous zone by displaying information on a road surface of the dangerous zone around the user's vehicle. Also, when the relative distance is short, by displaying the information on a body or a window of the vehicle, it is possible to guide the presentation target of the information not to look away from the vehicle.

Third Embodiment

In the first and second embodiments, it is described that the information display processing unit 12 of the information displaying unit 10 displays the information to the outside of the vehicle in accordance with the display data, but in a third embodiment, it is described that a situation around a vehicle is monitored and display of information by the information display processing unit 12 is controlled in accordance with a monitoring result of the situation.

Figure 11:
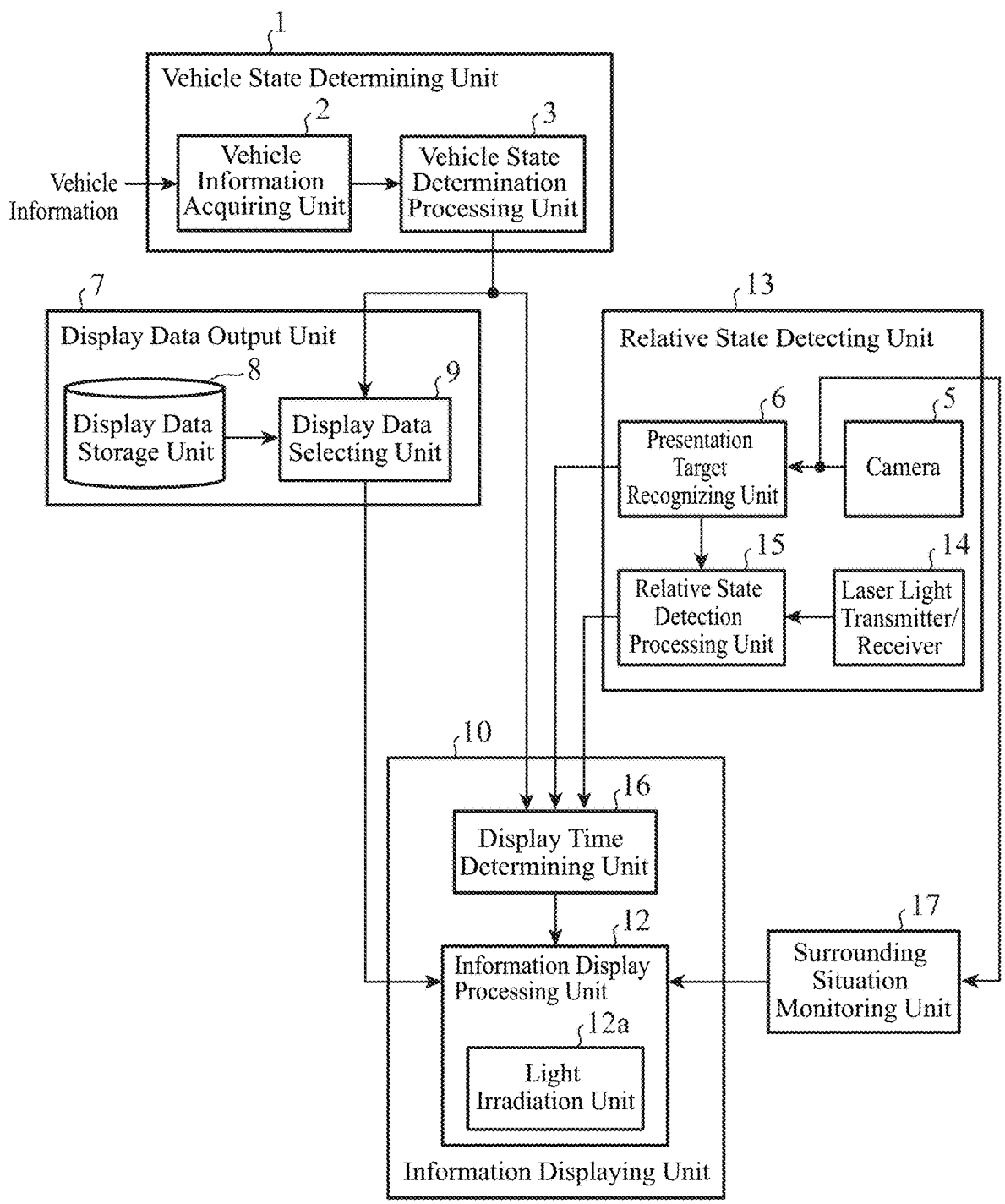
FIG. 11 is a configuration diagram illustrating an information display device according to a third embodiment of the present invention.
Figure 12:
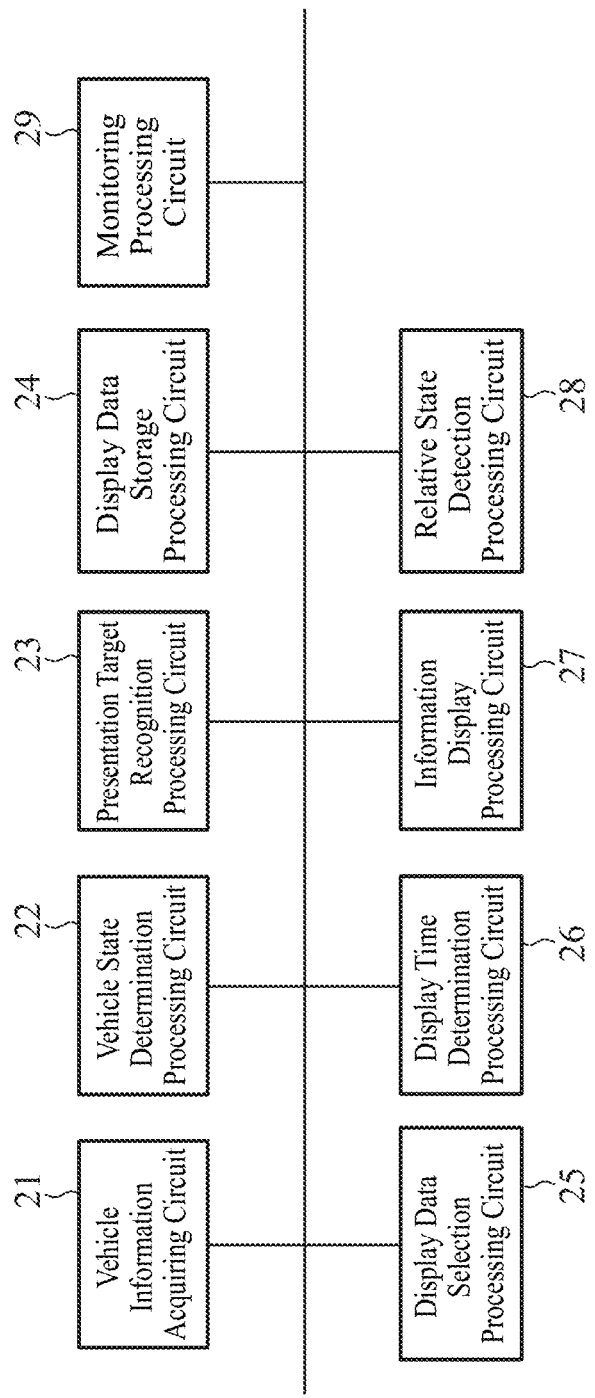
FIG. 12 is a hardware configuration diagram of the information display device according to the third embodiment of the present invention.

FIG. 11 is a configuration diagram illustrating an information display device according to the third embodiment of the present invention, and FIG. 12 is a hardware configuration diagram of the information display device according to the third embodiment of the present invention.

In FIGS. 11 and 12, the same reference signs as those in FIGS. 1, 2, 8, and 9 represent the same or corresponding parts, so that the description thereof is omitted.

A surrounding situation monitoring unit 17 implemented by, for example, a semiconductor integrated circuit on which a CPU is mounted, or a monitoring processing circuit 29 in FIG. 12 formed of a one-chip microcomputer and the like performs processing of monitoring a situation around a vehicle by visual data output from a camera 5 and controlling display of information in an information display processing unit 12 in accordance with a monitoring result of the situation around the vehicle.

In FIG. 11, it is supposed that a vehicle information acquiring unit 2, a vehicle state determination processing unit 3, a presentation target recognizing unit 6, a relative state detection processing unit 15, a display data storage unit 8, a display data selecting unit 9, the surrounding situation monitoring unit 17, a display time determining unit 16, and the information display processing unit 12 being components except the camera 5 and a laser light transmitter/receiver 14 of the information display device are implemented by dedicated hardware illustrated in FIG. 12, that is, a vehicle information acquiring circuit 21, a vehicle state determination processing circuit 22, a presentation target recognition processing circuit 23, a relative state detection processing circuit 28, a display data storage processing circuit 24, a display data selection processing circuit 25, the monitoring processing circuit 29, a display time determination processing circuit 26, and an information display processing circuit 27, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 8 may be configured on the memory 41 of the computer illustrated in FIG. 3 and a program for allowing the computer to execute processing procedures of the vehicle information acquiring unit 2, the vehicle state determination processing unit 3, the presentation target recognizing unit 6, the relative state detection processing unit 15, the display data selecting unit 9, the surrounding situation monitoring unit 17, the display time determining unit 16, and the information display processing unit 12 may be stored in the memory 41, and the processor 42 of the computer may execute the program stored in the memory 41.

Next, operations will be described.

However, the components other than the surrounding situation monitoring unit 17 are similar to those of the first and second embodiments, so that processing content of the surrounding situation monitoring unit 17 is herein described.

The surrounding situation monitoring unit 17 monitors the situation around the vehicle on the basis of the visual data output from the camera 5.

The surrounding situation monitoring unit 17 detects other vehicles, pedestrians and the like present in an image from the visual data of the camera by executing a well-known object recognition processing algorithm.

When other vehicles, pedestrians and the like are present around a user's vehicle, for example, in front of, lateral to, lateral front side of, lateral rear side of, and behind the vehicle, the surrounding situation monitoring unit 17 allows the information display processing unit 12 to execute processing of displaying the information in accordance with the display data.

When no other vehicle, pedestrian or the like is present around the user's vehicle, the surrounding situation monitoring unit 17 allows the information display processing unit 12 to stop executing the processing of displaying the information.

As a result, in a case in which there is no presentation target of the information such as a case in which there is no other vehicle, pedestrian or the like around the user's vehicle, useless information display may be stopped.

Fourth Embodiment

In the first to third embodiments, it is described that the information display processing unit 12 of the information displaying unit 10 displays the information to the outside of the vehicle in accordance with the display data, but in a fourth embodiment, it is described that display data output from a display data output unit 7 is processed in accordance with a state of a vehicle determined by a vehicle state determining unit 1 and information is displayed to the outside of the vehicle in accordance with the processed display data.

Figure 13:
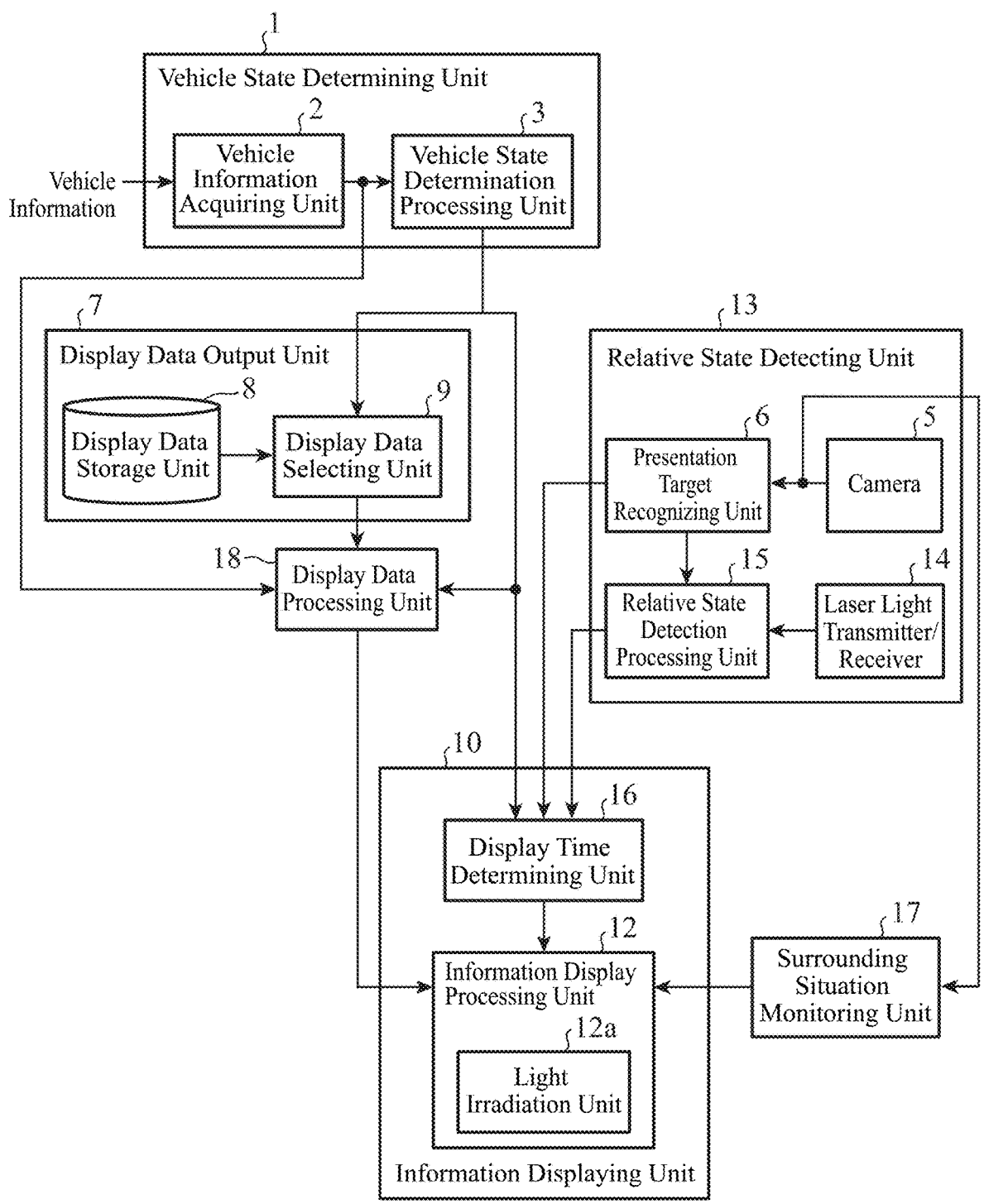
FIG. 13 is a configuration diagram illustrating an information display device according to a fourth embodiment of the present invention.
Figure 14:
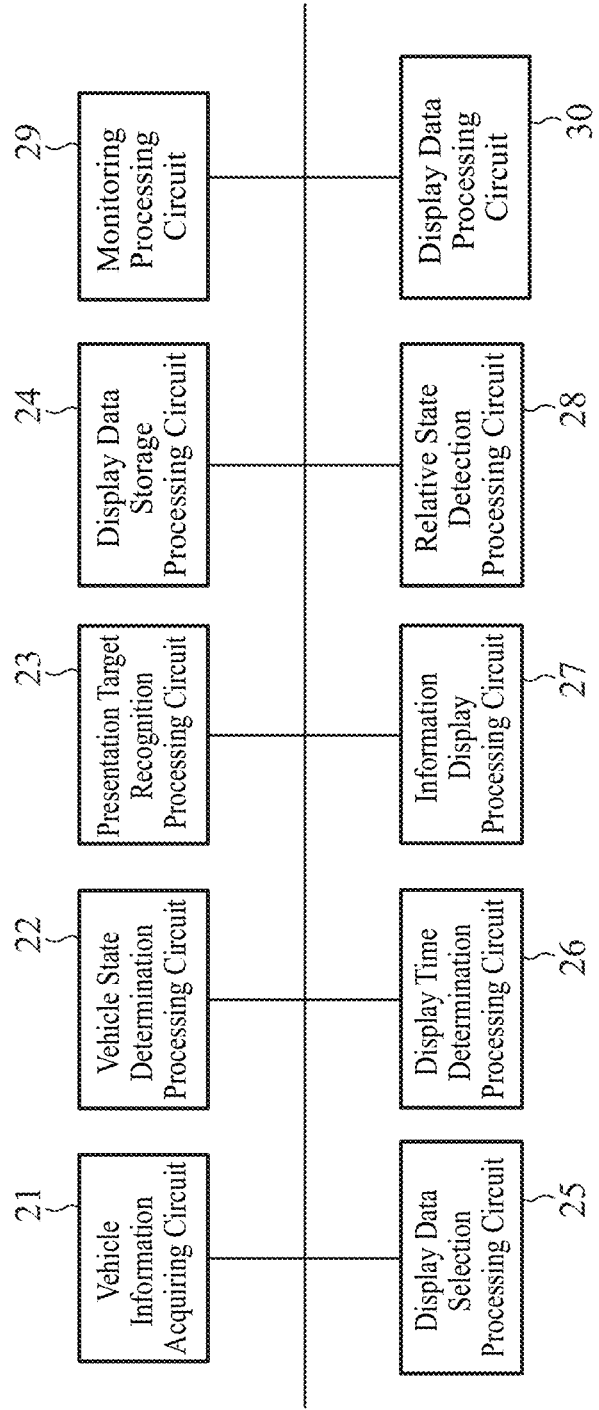
FIG. 14 is a hardware configuration diagram of the information display device according to the fourth embodiment of the present invention.

FIG. 13 is a configuration diagram illustrating an information display device according to the fourth embodiment of the present invention, and FIG. 14 is a hardware configuration diagram of the information display device according to the fourth embodiment of the present invention.

In FIGS. 13 and 14, the same reference signs as those in FIGS. 1, 2, 8, 9, 11, and 12 represent the same or corresponding parts, so that the description thereof is omitted.

A display data processing unit 18 implemented by, for example, a semiconductor integrated circuit on which a CPU is mounted or a display data processing circuit 30 in FIG. 14 formed of a one-chip microcomputer or the like performs processing of the display data selected by a display data selecting unit 9 in accordance with vehicle information acquired by a vehicle information acquiring unit 2 or a state of the vehicle determined by a vehicle state determination processing unit 3 and outputting processed display data to an information display processing unit 12 of an information displaying unit 10.

In FIG. 13, it is supposed that the vehicle information acquiring unit 2, the vehicle state determination processing unit 3, a presentation target recognizing unit 6, a relative state detection processing unit 15, a display data storage unit 8, the display data selecting unit 9, a surrounding situation monitoring unit 17, the display data processing unit 18, a display time determining unit 16, and the information display processing unit 12 being components except a camera 5 and a laser light transmitter/receiver 14 of the information display device are implemented by dedicated hardware illustrated in FIG. 14, that is, a vehicle information acquiring circuit 21, a vehicle state determination processing circuit 22, a presentation target recognition processing circuit 23, a relative state detection processing circuit 28, a display data storage processing circuit 24, a display data selection processing circuit 25, a monitoring processing circuit 29, the display data processing circuit 30, a display time determination processing circuit 26, and an information display processing circuit 27, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 8 may be configured on the memory 41 of the computer illustrated in FIG. 3 and a program for allowing the computer to execute processing procedures of the vehicle information acquiring unit 2, the vehicle state determination processing unit 3, the presentation target recognizing unit 6, the relative state detection processing unit 15, the display data selecting unit 9, the surrounding situation monitoring unit 17, the display data processing unit 18, the display time determining unit 16, and the information display processing unit 12 may be stored in the memory 41, and the processor 42 of the computer may execute the program stored in the memory 41.

Next, operations will be described.

However, the components other than the display data processing unit 18 are similar to those in the first embodiment, so that processing content of the display data processing unit 18 is mainly herein described.

When the display data processing unit 18 receives the display data from the display data selecting unit 9, this processes the display data in accordance with the vehicle information acquired by the vehicle information acquiring unit 2 or the state of the vehicle determined by the vehicle state determination processing unit 3 and outputs the processed display data to the information display processing unit 12 of the information displaying unit 10.

That is, for example, the display data processing unit 18 processes the display data depending on a speed of the vehicle included in the vehicle information acquired by the vehicle information acquiring unit 2.

Specifically, for example, as the speed of the vehicle is higher, the display data is processed such that a range of light to be irradiated to a road surface is enlarged, so that the information is displayed in a wider range, and visibility in a case of high-speed travel is improved.

Also, as the speed of the vehicle is higher, the display data is processed such that a playback speed of animation increases, for example, so that a sense of speed of the vehicle is transmitted.

The display data processing unit 18 also processes the display data in accordance with the state of the vehicle determined by the vehicle state determination processing unit 3.

Specifically, for example, in a case in which the vehicle is in a state of starting from an on-street parking state, the display data is processed such that a display position of a symbol and the like indicating a starting sign of the vehicle is changed, thereby enabling intuitive understanding of vehicle start. For example, the display position of the symbol indicating the starting sign of the vehicle is changed from a road surface on the right side of the vehicle→the road surface slightly forward on the right→the road surface on the right front side→ . . . →the road surface on the right side→the road surface slightly forward on the right→the road surface on the right front side.

Upon receiving the processed display data from the display data processing unit 18, the information display processing unit 12 of the information displaying unit 10 displays the information to the outside of the vehicle in accordance with the display data as in the first embodiment.

As is clear from the above description, according to the fourth embodiment, the display data processing unit 18 which processes the display data selected by the display data selecting unit 9 in accordance with the vehicle information acquired by the vehicle information acquiring unit 2 or the state of the vehicle determined by the vehicle state determination processing unit 3 is provided, and the information displaying unit 10 is configured to display the information to the outside of the vehicle in accordance with the display data processed by the display data processing unit 18, so that an effect similar to that of the first embodiment may be obtained and there is an effect of increasing the visibility of the information depending on the state of the vehicle.

Meanwhile, in the invention of the present application, embodiments may be freely combined, any component of each embodiment may be modified, or any component may be omitted in each embodiment without departing from the scope of the invention.

INDUSTRIAL APPLICABILITY

The information display device and information display method according to the present invention are suitable for use in displaying the information to the outside of the vehicle.

REFERENCE SIGNS LIST

1: Vehicle state determining unit, 2: Vehicle information acquiring unit, 3: Vehicle state determination processing unit, 4: Presentation target determining unit, 5: Camera, 6: Presentation target recognizing unit, 7: Display data output unit, 8: Display data storage unit, 9: Display data selecting unit, 10: Information displaying unit, 11, 16: Display time determining unit, 12: Information display processing unit, 12a: Light irradiation unit, 13: Relative state detecting unit, 14: Laser light transmitter/receiver, 15: Relative state detection processing unit, 17: Surrounding situation monitoring unit, 18: Display data processing unit, 21: Vehicle information acquiring circuit, 22: Vehicle state determination processing circuit, 23: Presentation target recognition processing circuit, 24: Display data storage processing circuit, 25: Display data selection processing circuit, 26: Display time determination processing circuit, 27: Information display processing circuit, 28: Relative state detection processing circuit, 29: Monitoring processing circuit, 30: Display data processing circuit, 41: Memory, 42: Processor

The invention claimed is:

1. An information display device, comprising:
a processor; and
a memory storing instructions which, when executed by the processor, causes the processor to:
determine a state of a vehicle including a traveling direction of the vehicle and a speed of the vehicle;
output display data for displaying information indicating the determined state of the vehicle;
determine a target to which the information is presented; and
determine display time period of the information from the determined state of the vehicle and the determined target to which the information is presented, and display the information to an outside of the vehicle in accordance with the output display data during the display time,
wherein the processor selects a projection surface of the information in accordance with the determined display time period.

2. The information display device according to claim 1, wherein the processor further detects a relative state between a user's vehicle and the target to which the information is presented,
wherein the processor corrects the display time using the detected relative state.

3. The information display device according to claim 1, wherein the processor determines the relative state between the user's vehicle and the target to which the information is presented as the state of the vehicle.

4. An information display device, comprising:
a processor; and
a memory storing instructions which, when executed by the processor, causes the processor to:
determine a state of a vehicle including a traveling direction of the vehicle and a speed of the vehicle;
output display data for displaying information indicating the determined state of the vehicle; and
determine a display time period of the information from the determined state of the vehicle and display the information to an outside of the vehicle in accordance with the output display data during the determined display time period,
wherein the processor displays the information indicating the state of the vehicle on a projection surface by irradiating the projection surface outside the vehicle with light in accordance with the output display data and
select at least one of the projection surface and a type of the light irradiated to the projection surface in accordance with the determined display time period.

5. The information display device according to claim 1, wherein the processor further:
monitors a situation around the vehicle and controlling display of the information in accordance with a monitoring result of the situation.

6. The information display device according to claim 1, wherein the processor further:
processes the output display data in accordance with the state of the vehicle,
wherein the processor displays the information to the outside of the vehicle in accordance with the processed display data.

7. An information display method, comprising:
determining, by a vehicle state determining unit, a state of a vehicle including a traveling direction of the vehicle and a speed of the vehicle;
outputting, by a display data output unit, display data for displaying information indicating the state of the vehicle determined by the vehicle state determining unit;
determining, by a presentation target determining unit, a target to which the information is presented;
determining, by an information displaying unit, a display time period of the information from the state of the vehicle determined by the vehicle state determining unit and the presentation target determined by the presentation target determining unit, and
displaying, by the information displaying unit, the information to an outside of the vehicle in accordance with the display data output from the display data output unit during the determined display time period; and
selecting, by the information displaying unit, a projection surface of the information in accordance with the determined display time period.

8. An information display method, comprising:
determining, by a vehicle state determining unit, a state of a vehicle including a traveling direction of the vehicle and a speed of the vehicle;

outputting, by a display data output unit, display data for displaying information indicating the state of the vehicle determined by the vehicle state determining unit;

determining, by an information displaying unit, a display time period of the information from the state of the vehicle determined by the vehicle state determining unit and displaying, by the information displaying unit, the information to an outside of the vehicle in accordance with the display data output from the display data output unit during the determined display time period;

displaying, by a light irradiation unit included in the information displaying unit, information indicating the state of the vehicle on a projection surface by irradiating the projection surface outside the vehicle with light in accordance with the display data output from the display data output unit; and selecting, by the light irradiation unit, at least one of the projection surface and a type of the light irradiated to the projection surface in accordance with the determined display time period.

\* \* \* \* \*